Jan. 18, 1949. J. W. PACKIE ET AL 2,459,451
BUTADIENE EXTRACTION
Filed Feb. 2, 1945
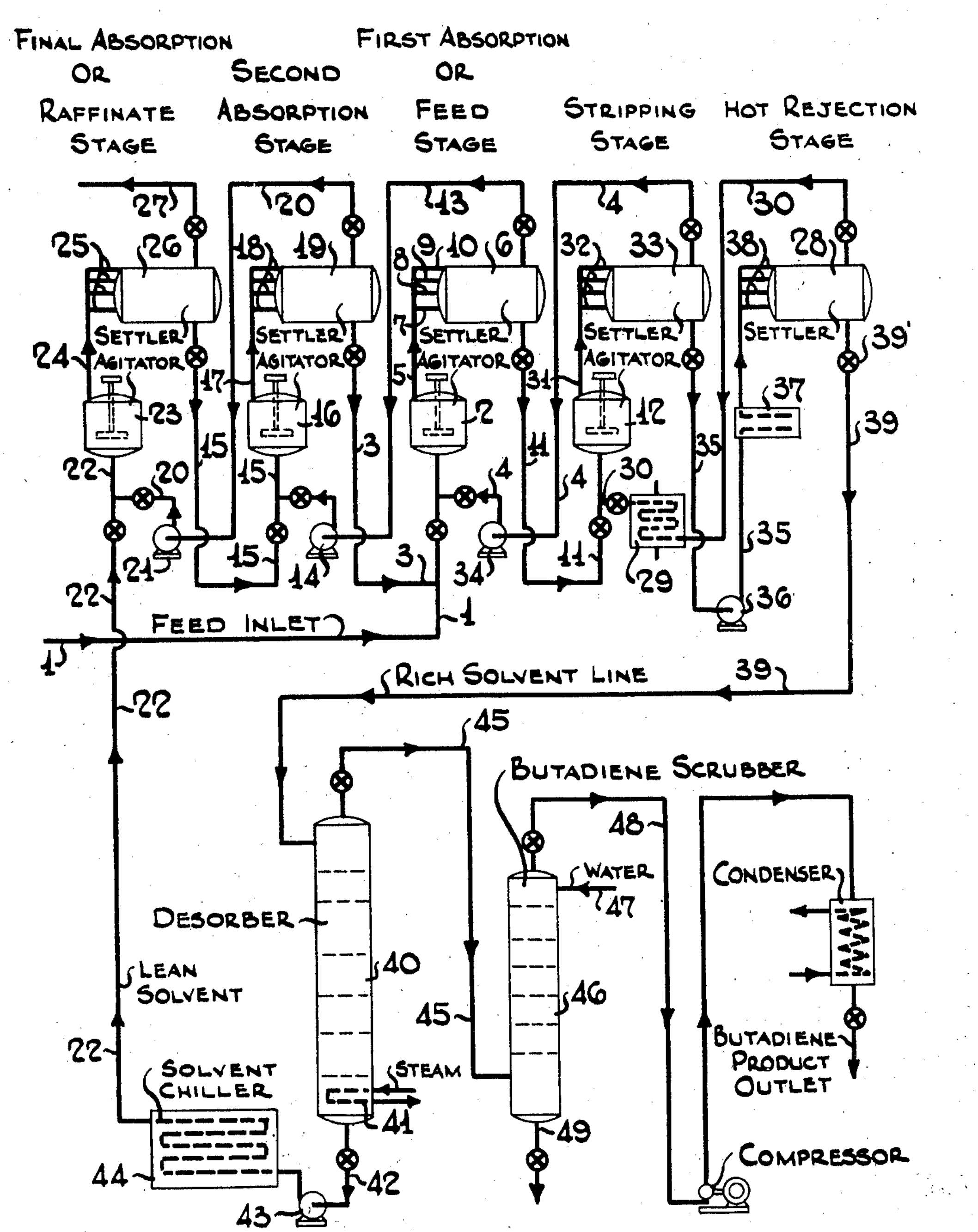
John W. Packie
Edwin M. Glazier Inventors
By P. L. Young Attorney Patented Jan. 18, 1949 2,459,451

UNITED STATES PATENT OFFICE 2,459,451

BUTADIENE EXTRACTION

John W. Packie, Green Village, and Edwin M. Glazier, Elizabeth, N. J., assignors to Standard Oil Development Company, a corporation of Delaware Application February 2, 1945, Serial No. 575,817

8 Claims. (Cl. 260—681.5)

1

This invention relates to improvements in the extraction of hydrocarbons and relates particularly to the extraction of diolefins from mixtures of hydrocarbons consisting of saturated and unsaturated hydrocarbons and other low boiling compounds.

In the extraction of hydrocarbons, for example in the separation of unsaturated hydrocarbons from mixtures of saturated and unsaturated hydrocarbons together with other low boiling compounds, various solvents can be used as extractants but it has always been difficult to remove all of the desired constituents from the mixture of hydrocarbons and also to obtain a pure extract containing only the desired constituents and not an extract containing a major portion of the desired constituent and a substantial portion of the undesirable constituents that were present in the original hydrocarbon mixture.

It is an object of this invention to provide improvements in the method of extracting from a mixture of hydrocarbons an unsaturated hydrocarbon in a substantially pure form.

Another object of this invention is to provide a method in which substantially all of the desired constituents are removed from the mixture of hydrocarbons and recovered in a substantially pure form.

These and other objects of the invention will be understood on reading the following description with reference to the drawing illustrating diagrammatically the flow of materials.

For example, the separation of butadiene from liquid mixtures of hydrocarbons containing 4 carbon atoms to the molecule using an ammoniacal cuprous acetate solution as the solvent and a turbine-type mixer as the agitator will be described, but it is not intended to limit this invention to the separation and segregation of butadiene alone or the use of this particular solvent alone or to the use of a turbine-type agitator, as the method may likewise be used for the separation of other compounds such as isoprene, ethylene, styrene, etc., using other preferential solvents, such as cuprous ammonium chloride solutions and may be accomplished with other types of agitators.

In the extraction of butadiene from a $C_4$ stream with copper ammonium acetate solution by countercurrently contacting the solvent and hydrocarbon in a series of mixers followed by drum settlers, a portion of the hydrocarbon is not settled from the solvent and is thus carried along countercurrently to the normal flow of hydrocarbon. The present invention provides a method of operating the several mixers to obtain intimate contact between the hydrocarbon and solvent phases while minimizing the detrimental effect of entrained hydrocarbon with the solvent.

2

In a typical train of mixer-settlers used to extract butadiene from a $C_4$ stream, the hydrocarbon feed is charged at an intermediate point and flows countercurrent to the solvent through the absorption stages and the hydrocarbon from the last settler is withdrawn as the final raffinate. The cold lean solvent is charged to the raffinate stage and by successive contacts with the hydrocarbon phase in the several absorption stages, essentially all of the butadiene is absorbed by the solvent and the final raffinate contains practically none of this material. The solvent from the feed stage contains approximately all of the butadiene entering the system in the fresh feed, plus additional butadiene which is rejected from the solvent in the last stage by the addition of heat and flows countercurrently to the solvent through the stripping stages. This rejected butadiene selectively strips from solution the materials other than butadiene which are contained in the solvent from the feed stage in relatively small quantities, until the hydrocarbon dissolved in the solvent consists of butadiene of the desired purity. The quantity of hydrocarbon remaining in the solvent leaving the last stage is slightly less than the quantity of butadiene entering the system with the fresh feed due to the fact that a small quantity of butadiene is contained in the final raffinate stream.

Referring to the drawing, the mixture of hydrocarbons is passed through pipe 1 into a turbine-type agitator 2, together with the solvent for extracting butadiene which is introduced into pipe 1 by means of pipe 3. Into this pipe 1 is also introduced, through pipe 4, hydrocarbons that have been removed from the solvent extract as will be hereafter described. This mixture of solvent extract and hydrocarbons is intimately mixed in turbine-type agitator 2. The intimately mixed mixture is then passed through pipe 5 into the settling chamber 6 by means of a plurality of pipes 7, 8, 9, and 10. This settling chamber is maintained at a temperature of about 18° F. and at a pressure of about 5–18 lbs. per square inch gauge. Cooling means may be provided by an outside jacket, not shown.

The mixture, in this settling chamber, separates into two phases, one a hydrocarbon phase and the other an extract phase containing the solvent with the butadiene dissolved therein. This solvent with butadiene and some undesired hydrocarbons dissolved therein is removed through pipe 11 and passed to turbine-type agitator 12. The undissolved hydrocarbons are removed from settler 6 by means of pipe 13 and passed by means of pump 14 into pipe 15 through which is passed the solvent extract solution. The mixture of hydrocarbons and the solvent extract is then passed into turbine-type agitator 16 where they are intimately contacted and then passed through pipe 17 and a plurality of pipes 18 into settler 19 where a separation takes place, the lower layer containing the solvent extract being passed through pipe 3 into pipe 1 and the upper layer of unabsorbed hydrocarbons being passed through pipe 20 by means of pump 21 into line 22, through which a solvent substantially free of hydrocarbons is being passed to turbine-type agitator 23. The mixture of hydrocarbons and solvent is intimately contacted by means of this turbine-type agitator 23. This mixture then passes through pipe 24 and, by means of a plurality of pipes 25, into settler 26 where layer separation takes place and the upper layer substantially free of butadiene is removed through pipe 27 from the system, the lower layer of solvent with butadiene in solution passing through pipe 15 to the turbine-type agitator 16.

These three absorption steps as carried out in turbine-type agitators 2, 16 and 23, in combination with settlers 6, 19 and 26, are maintained at temperatures below room temperature, that is 18°, 14°, and 10° F. and pressures of 18, 21, and 24 lbs. per square inch gauge. It is obvious that lower temperatures and somewhat higher temperatures may be used and also that the pressure may be varied within the limits set by the freezing point of the particular solution and the vapor pressure of the hydrocarbon liquid.

The solvent containing substantially all of the butadiene and some of the other hydrocarbons that were present in the charge hydrocarbon mixture leaves settler 6 and passes through pipe 11. In turbine-type agitator 12, it is intimately contacted with hydrocarbons, principally butadiene, that have been rejected from settler 28 and passed through cooler 29 by means of pipe 30. In this agitator 12 the butadiene is preferentially dissolved in the hydrocarbon phase and undesired hydrocarbons are preferentially rejected from the solvent phase. The mixture of hydrocarbon and solvent phases is passed through pipe 31 and a plurality of pipes 32 and is separated in settler 33. The temperature maintained in settler 33 is about 25° F. and the pressure is about 15 lbs. per square inch gauge. The hydrocarbon phase is passed through pipe 4, provided with pump 34, into pipe 1. The solvent layer, operated in settler 33 is passed through pipe 35 by means of pump 36 through heater 37 and by a plurality of pipes 38 to settler 28 where a temperature of about 90° F. and a pressure of 50 lbs. per square inch gauge is maintained. The elevated temperature maintained in settler 28 rejects substantially all of the rest of the undesired hydrocarbons from the solvent, together with some butadiene. This hydrocarbon phase is passed through pipe 30 into line 11 and the solvent containing substantially all of the butadiene that was present in the charge hydrocarbon mixture is removed through pipe 39 and passed to the upper part of desorber 40. Pipe 39 is provided with a reducing valve 39' to lower the pressure to about 10 lbs. per square inch gauge. Steam is supplied to the lower part of the desorber by means of steam coil 41 in the lower part of the desorber 40. The temperature here maintained is about 170° F. The solvent substantially free of dissolved hydrocarbons, is withdrawn from the bottom portion of desorber 40 by means of pipe 42 and passed by means of pump 43 through chiller 44 to reduce the temperature to about 8° F. and through pipe 22 into turbine-type agitator 23. Substantially pure butadiene with some ammonia vapor is recovered from the upper part of the desorber 40 and passed through pipe 45 upward through the butadiene scrubber 46 wherein water, provided at the upper part by means of pipe 47, removes substantially all of the ammonia from the butadiene. The wash water is removed from the lower part of the scrubber by means of pipe 49 while pure butadiene is removed from the upper part by means of pipe 48 and is then liquefied as the desired product.

The speeds of the turbo-mixers used to contact the solvent and hydrocarbon are adjustable. The intimacy of contact and thus the approach to equilibrium between the two phases varies directly with the speed of the mixers and the holdup time therein, while the sharpness of separation in the settlers varies inversely with the mixer speeds and directly with the holdup time in the settlers. The holdup times in the mixers and settlers are constant for any given rate of flow of hydrocarbon and solvent through the system, thus leaving the speeds of the turbo-mixer as the controllable variable.

In order to operate the turbo-mixers at high speeds to obtain a close approach to equilibrium but not to severely penalize the system by excessive entrainment of hydrocarbon with the solvent, it is necessary to operate the mixers at different speeds depending upon their relative positions in the train of mixer-settler stages. This procedure is necessary because the effect of hydrocarbon entrainment on the overall operation of the system varies depending on the concentration of the entrained hydrocarbon and on the relative quantities of hydrocarbon recycle from these stages or, in other words, on the position in the system. It is necessary to minimize the hydrocarbon entrainment from the feed stage into the stripping stage due to the fact that the quantity of hydrocarbon flowing in the stripping section is only about 15% of that in the absorption section, and the differential in concentration of butadiene in the hydrocarbon phases for the feed stage and the stripping stage is appreciably greater than the differential existing between any other successive stages in the system. These two factors mean that entrainment at this point has a magnified effect on the concentration of butadiene throughout the stripping section and it is, therefore, of prime importance to keep the entrainment of hydrocarbon from the feed stage to a minimum by reducing the speed of the agitator in the feed stage. Excessive entrainment of hydrocarbon into the final or hot rejection stage is also to be avoided at all costs, since the hydrocarbon dissolved in the solvent at this latter point is the final product and the quantity of stripping recycle required to produce the desired product purity increases very rapidly with relatively small increases in the amount of impurities carried into this stage. However, entrainment in the stripping stage is not as much a problem as it is in the feed stage and the absorption stages. Hence, the stripping stage can be operated at a fairly high speed which may be more or less constant in each stage. Based on these factors, it has been found that the lowest possible speed must be maintained in the feed stage with the speed increasing in each succeeding absorption stage in the direction in which the hydrocarbon flows. In practice it will be found desirable to maintain the agitator speeds in the final absorption stage and in the stripping stage substantially the same.

Since it is desirable to utilize settlers that are as small as possible to minimize the cost of the installation, while reducing the entrainment of hydrocarbon with the solvent as much as possible, particularly at the positions where it is most harmful so as to give maximum capacity and maximum recovery and product purity, the following critical conditions have been found essential for optimum operation of the process:

| | |
|---|---|
| Settling rate ........ in./min. (maximum) | 1.5 |
| Residence time in mixers .. min. (minimum) | 1.6 |
| Temperatures ........ °F. | 8 to 100 |
| Pressures ........ lbs./sq. in. | 5–50 |
| Cuprous copper concentration in solvent | 3±0.2N |
| $C_4H_6$ in $C_4$ phase ........ per cent | 0.2 to 98 |
| Peripheral speed of turbo mixers: | |
| Raffinate stage ........ ft./min. | 450–540 |
| Absorption stage ........ ft./min. | 390–450 |
| Feed stage ........ ft./min. | 240–330 |
| Stripping stage ........ ft./min. | 450–540 |

Although the present invention has been described with a certain degree of particularity, it is to be understood that the present disclosure has been made only by way of example and that numerous changes in the details of the flow plan and other features of the process may be resorted to without departing from the spirit and scope of the invention as hereinafter claimed. For example, while only one stripping stage and two absorption stages have been shown, any desired number of stages can be used.

The nature and objects of the present invention having thus been set forth and a specific illustration of the same given, what is claimed as new and useful and desired to be secured by Letters Patent is:

1. In the liquid phase solvent extraction of an olefin from a mixture of olefins and saturated hydrocarbons in a plurality of stages each stage comprising a turbine-type agitator and a settling chamber in which (1) the solvent passes through the stages in progressively increasing concentration of the olefin content and the hydrocarbon mixture passes through the stages in progressively decreasing content of the olefin, (2) fresh hydrocarbon is intimately contacted with a preferential solvent for an olefin in a feed stage, (3) the mixture of hydrocarbon and solvent is first passed to the turbine type agitator of the feed stage and then to the settling chamber of the feed stage to form a solvent phase and a hydrocarbon phase, (4) the solvent phase after being separated is contacted with a hydrocarbon phase, having a higher olefin concentration than the hydrocarbon phase from which it was separated, (5) the hydrocarbon phase after being separated is contacted with a solvent phase, having a lower olefin content than the one from which it was separated, (6) the solvent phase after passing through the turbine type agitator and settling chamber of the last stage is heated and passed to a settling chamber to expel in the liquid phase substantially all hydrocarbons except the desired olefin, (7) the expelled hydrocarbons are separated from the solvent phase in the said settling chamber, (8) the separated hydrocarbons are recycled to the solvent phase passing to the turbine type agitator and settling chamber of the last stage and (9) the olefin is expelled from the said solvent phase, from which substantially all of the hydrocarbon except the desired olefin was expelled, by heating to a sufficiently high temperature to vaporize the olefin, the improvement which comprises increasing the speed of agitation in each turbine-type agitator succeeding the feed stage in the direction of hydrocarbon flow and maintaining the speed of the agitation in each turbine-type agitator succeeding the feed stage in the direction of solvent flow at substantially the same rate as that in the final stage following the feed stage in the direction of hydrocarbon flow.

2. In the liquid phase solvent extraction of a diolefin from a mixture of diolefins, olefins and saturated hydrocarbons in a plurality of stages, each stage comprising a turbine type agitator and a settling chamber in which (1) the solvent passes through the stages in progressively increasing concentration of the diolefin content and the hydrocarbon mixture passes through the stages in progressively decreasing content of the diolefin, (2) fresh hydrocarbon is intimately contacted with a preferential solvent for a diolefin in a feed stage, (3) the mixture of hydrocarbon and solvent is first passed to the turbine type agitator of the feed stage and then to the settling chamber of the feed stage to form a solvent phase and a hydrocarbon phase, (4) the solvent phase after being separated is contacted with a hydrocarbon phase, having a higher diolefin concentration than the hydrocarbon phase from which it was separated, (5) the hydrocarbon phase after being separted is contacted with a solvent phase, having a lower diolefin content than the one from which it was separated, (6) the solvent phase after passing through the turbine type agitator and settling chamber of the last stage is heated and passed to a settling chamber to expel in the liquid phase substantially all hydrocarbons except the desired diolefin, (7) the expelled hydrocarbons are separated from the solvent phase in the said settling chamber, (8) the separated hydrocarbons are recycled to the solvent phase passing to the turbine type agitator and settling chamber of the last stage and (9) the diolefin is expelled from the said solvent phase from which substantially all of the hydrocarbon except the desired diolefin was expelled by heating to a sufficiently high temperature to vaporize the diolefin, the improvement which comprises increasing the speed of agitation in each turbine-type agitator succeeding the feed stage in the direction of hydrocarbon flow and maintaining the speed of the agitation in each turbine type agitator succeeding the feed stage in the direction of solvent flow at substantially the same rate as that in the final stage following the feed stage in the direction of hydrocarbon flow.

3. In the liquid phase extraction of a diolefin with a cuprous salt solution from a mixture of hydrocarbons containing a diolefin in a plurality of stages, each stage comprising a turbine-type agitator and a settling chamber in which (1) the cuprous salt solution passes through the stages in progressively increasing concentration of the diolefin content and the hydrocarbon mixture passes through the stages in progressively decreasing content of the diolefin, (2) fresh hydrocarbon is intimately contacted with a cuprous salt solution in a feed stage, (3) the mixture of hydrocarbon and cuprous salt solution is first passed to the turbine type agitator of the feed stage and then to the settling chamber of the feed stage to form a solvent phase and a hydrocarbon phase, (4) the solvent phase after being separated is contacted with a hydrocarbon phase, having a higher diolefin concentration than the hydrocarbon phase from which it was separated, (5) the hydrocarbon phase after being separated is contacted with a solvent phase, having a lower diolefin content than the one from which it was separated, (6) the solvent phase after passing through the turbine type agitator and settling chamber of the last stage is heated and passed to a settling chamber to expel in the liquid phase substantially all hydrocarbons except the desired diolefins, (7) the expelled hydrocarbons are separated from the solvent phase in the said settling chamber, (8) the separated hydrocarbons are recycled to the solvent phase passing to the turbine type agitator and settling chamber of the last stage and (9) the diolefin is expelled from the said solvent phase from which substantially all of the hydrocarbon except the desired diolefin was expelled by heating to a sufficiently high temperature to vaporize the diolefin, the improvement which comprises increasing the speed of agitation in each turbine type agitator succeeding the feed stage in the direction of hydrocarbon flow and maintaining the speed of the agitation in each turbine type agitator succeeding the feed stage in the direction of the flow of the cuprous salt solution at substantially the same rate as that in the final stage following the feed stage in the direction of hydrocarbon flow.

4. In the liquid phase solvent extraction of butadiene from a mixture of butadiene, olefins and saturated hydrocarbons in a plurality of stages, each stage comprising a turbine type agitator and a settling chamber in which (1) the solvent passes through the stages in progressively increasing concentration of the butadiene content and the hydrocarbon mixture passes through the stages in progressively decreasing content of the butadiene, (2) fresh hydrocarbon is intimately contacted with a preferential solvent for butadiene in a feed stage, (3) the mixture of hydrocarbon and solvent is first passed to the turbine type agitator of the feed stage and then to the settling chamber of the feed stage to form a solvent phase and a hydrocarbon phase, (4) the solvent phase after being separated is contacted with a hydrocarbon phase, having a higher butadiene concentration than the hydrocarbon phase from which it was separated, (5) the hydrocarbon phase after being separated is contacted with a solvent phase, having a lower butadiene content than the one from which it was separated, (6) the solvent phase after passing through the turbine type agitator and settling chamber of the last stage is heated and passed to a settling chamber to expel in the liquid phase substantially all hydrocarbons except the desired butadiene, (7) the expelled hydrocarbons are separated from the solvent phase in the said settling chamber, (8) the separated hydrocarbons are recycled to the solvent phase passing to the turbine type agitator and settling chamber of the last stage and (9) the butadiene is expelled from the said solvent phase from which substantially all of the hydrocarbon except the desired butadiene was expelled by heating to a sufficiently high temperature to vaporize the butadiene, the improvement which comprises increasing the speed of agitation in each turbine type agitator succeeding the feed stage in the direction of hydrocarbon flow and maintaining the speed of the agitation in each turbine type agitator succeeding the feed stage in the direction of solvent flow at substantially the same rate as that in the final stage following the feed stage in the direction of hydrocarbon flow.

5. In the liquid phase extraction of butadiene with a cuprous salt solution from a mixture of hydrocarbons containing butadiene in a plurality of stages, each stage comprising a turbine type agitator and a settling chamber in which (1) the cuprous salt solution passes through the stages in progressively increasing concentration of the butadiene content and the hydrocarbon mixture passes through the stages in progressively decreasing content of the butadiene, (2) fresh hydrocarbon is intimately contacted with a cuprous salt solution for butadiene in a feed stage, (3) the mixture of hydrocarbon and cuprous salt solution is first passed to the turbine type agitator of the feed stage and then to the settling chamber of the feed stage to form a solvent phase and a hydrocarbon phase, (4) the solvent phase after being separated is contacted with a hydrocarbon phase, having a higher butadiene concentration than the hydrocarbon phase from which it was separated, (5) the hydrocarbon phase after being separated is contacted with a solvent phase, having a lower butadiene content than the one from which it was separated, (6) the solvent phase after passing through the turbine type agitator and settling chamber of the last stage is heated and passed to a settling chamber to expel in the liquid phase substantially all hydrocarbons except the desired butadiene, (7) the expelled hydrocarbons are separated from the solvent phase in the said settling chamber, (8) the separated hydrocarbons are recycled to the solvent phase passing to the turbine type agitator and settling chamber of the last stage and (9) the butadiene is expelled from the said solvent phase from which substantially all of the hydrocarbon except the desired butadiene was expelled by heating to a sufficiently high temperature to vaporize the butadiene, the improvement which comprises increasing the speed of agitation in each turbine-type agitator succeeding the feed stage in the direction of hydrocarbon flow and maintaining the speed of the agitation in each turbine type agitator succeeding the feed stage in the direction of the flow of the cuprous salt solution at substantially the same rate as that in the final stage following the feed stage in the direction of hydrocarbon flow.

6. In the liquid phase extraction of butadeine with an ammoniacal cuprous acetate solution from a mixture of hydrocarbons containing butadiene in a plurality of stages, each stage comprising a turbine type agitator and a settling chamber in which (1) the ammoniacal cuprous acetate solution passes through the stages in progressively increasing concentration of the butadiene content and the hydrocarbon mixture passes through the stages in progressively decreasing content of the butadiene, (2) fresh hydrocarbon is intimately contacted with an ammoniacal cuprous acetate solution for butadeine in a feed stage, (3) the mixture of hydrocarbon and an ammoniacal cuprous acetate solution is first passed to the turbine type agitator of the feed stage and then to the settling chamber of the feed stage to form a solvent phase and a hydrocarbon phase, (4) the solvent phase after being separated is contacted with a hydrocarbon phase, having a higher butadiene concentration than the hydrocarbon phase from which it was separated, (5) the hydrocarbon phase after being separated is contacted with a solvent phase, having a lower butadiene content than the one from which it was separated, (6) the solvent phase after passing through the turbine type agitator and settling chamber of the last stage is heated and passed to a settling chamhber to expel in the liquid phase substantially all hydrocarbons except the desired butadiene, (7) the expelled hydrocarbons are separated from the solvent phase in the said settling chamber, (8) the separated hydrocarbons are recycled to the solvent phase passing to the turbine type agitator and settling chamber of the last stage and (9) the butadiene is expelled from the said solvent phase from which substantially all of the hydrocarbon except the desired butadiene had been expelled by heating to a sufficiently high temperature to vaporize the butadiene, the improvement which comprises increasing the speed of agitation in each turbine-type agitator succeeding the feed stage in the direction of hydrocarbon flow and maintaining the speed of the agitation in each turbine type agitator succeeding the feed stage in the direction of flow of the ammoniacal cuprous acetate solution at substantially the same rate as that in the final stage following the feed stage in the direction of hydrocarbon flow.

7. Process according to claim 6 in which the rotor speeds of the agitator in the feed stage is of such value as to give a peripheral speed between 240 and 330 feet per minute therein.

8. Process according to claim 6 in which the rotor speed of the agitator in the feed stage is of such value as to give a peripheral speed of 240 to 330 feet per minute therein and the rotor speed in the final absorption and desorption stages are of such values as to give a peripheral speed of 450 to 540 feet per minute therein.

JOHN W. PACKIE.
EDWIN M. GLAZIER.

REFERENCES CITED

The following references are of record in the file of this patent:

UNITED STATES PATENTS

| Number | Name | Date |
|---|---|---|
| 1,651,328 | Edeleanu | Nov. 29, 1927 |
| 2,149,574 | Brown | Mar. 7, 1939 |
| 2,154,676 | Haueber et al. | Apr. 18, 1939 |
| 2,216,602 | Regatz | Oct. 1, 1940 |
| 2,369,559 | Gilliland | Feb. 13, 1945 |
| 2,383,784 | Fleer | Aug. 28, 1945 |
| 2,388,913 | Hall | Nov. 13, 1945 |
| 2,420,906 | Packie et al. | May 20, 1947 |